(12) United States Patent
Foerstner et al.

(10) Patent No.: US 12,164,281 B2
(45) Date of Patent: Dec. 10, 2024

(54) HAND-GUIDED GARDEN, FORESTRY AND/OR CONSTRUCTION WORKING APPARATUS AND METHOD FOR A HAND-GUIDED GARDEN, FORESTRY AND/OR CONSTRUCTION WORKING APPARATUS

(71) Applicant: Andreas Stihl AG & Co. KG, Waiblingen (DE)

(72) Inventors: Dirk Foerstner, Stuttgart (DE); Denis Ehrler, Wernau (DE); Michael Varga, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 889 days.

(21) Appl. No.: 17/082,774

(22) Filed: Oct. 28, 2020

(65) Prior Publication Data
US 2021/0124335 A1   Apr. 29, 2021

(30) Foreign Application Priority Data

Oct. 29, 2019  (EP) ..................... 19205819

(51) Int. Cl.
*G05B 19/416* (2006.01)
*A01D 34/00* (2006.01)
(Continued)

(52) U.S. Cl.
CPC ......... *G05B 19/416* (2013.01); *A01D 34/006* (2013.01); *A01D 46/253* (2013.01);
(Continued)

(58) Field of Classification Search
CPC .. A01D 46/253; A01D 69/02; A01D 2101/00; A01G 3/0535; A01G 3/067; A01G 3/088
See application file for complete search history.

(56) References Cited

U.S. PATENT DOCUMENTS 9,084,396 B2 *  7/2015  Sato ........................... B25F 5/02
9,314,914 B2 *  4/2016  Suda ........................ B25F 5/026
(Continued)

FOREIGN PATENT DOCUMENTS

CN     205142981 U     4/2016
CN     107912127 A     4/2018
(Continued)

OTHER PUBLICATIONS

Chinese-language Office Action issued in Chinese Application No. 202011183671.8 dated Dec. 28, 2023 with English translation (27 pages).

*Primary Examiner* — Thomas M Wittenschlaeger
*Assistant Examiner* — David G Shutty
(74) *Attorney, Agent, or Firm* — Crowell & Moring LLP (57) ABSTRACT

A hand-guided garden, forestry and/or construction working apparatus has an inactive state, an active state and a variable setting, as well as an apparatus operator control element which can be activated by a user. In the inactive state, the garden, forestry and/or construction working apparatus is designed to be transferred into the active state triggered by activation of the apparatus operator control element, and in the active state the garden, forestry and/or construction working apparatus is designed to change the setting and not to be transferred into the inactive state triggered by activation of the apparatus operator control element.

14 Claims, 4 Drawing Sheets

(51) Int. Cl.
*A01D 46/253* (2006.01)
*A01D 69/02* (2006.01)
*A01G 3/047* (2006.01)
*A01G 3/053* (2006.01)
*A01G 3/06* (2006.01)
*A01G 3/08* (2006.01)
*A01G 20/47* (2018.01)
*A01D 101/00* (2006.01)

(52) U.S. Cl.
CPC ........... *A01D 69/02* (2013.01); *A01G 3/0475* (2013.01); *A01G 3/0535* (2013.01); *A01G 3/067* (2013.01); *A01G 3/088* (2013.01); *A01G 20/47* (2018.02); *A01D 2101/00* (2013.01); *G05B 2219/41328* (2013.01)

(56) References Cited

U.S. PATENT DOCUMENTS

| | | | | |
|---|---|---|---|---|
| 9,444,307 | B2 * | 9/2016 | Watanabe | H01H 9/061 |
| 9,782,884 | B2 * | 10/2017 | Ota | A01D 34/90 |
| 10,293,445 | B2 * | 5/2019 | Gerstenberger | B23Q 11/0078 |
| 2010/0313430 | A1 * | 12/2010 | Yamaoka | A01D 34/828 |
| | | | | 30/276 |
| 2012/0023761 | A1 * | 2/2012 | Martinsson | A01G 3/085 |
| | | | | 30/277.4 |
| 2014/0165525 | A1 * | 6/2014 | Nagata | A01D 34/90 |
| | | | | 56/11.2 |
| 2014/0174772 | A1 * | 6/2014 | Mandalka | B25F 5/00 |
| | | | | 173/1 |
| 2016/0149520 | A1 | 5/2016 | Ota et al. | |
| 2016/0250744 | A1 | 9/2016 | Windsheimer | |
| 2017/0332541 | A1 | 11/2017 | Gyuricza et al. | |
| 2018/0092298 | A1 | 4/2018 | Takahashi et al. | |
| 2021/0289699 | A1 | 9/2021 | Fukano et al. | |

FOREIGN PATENT DOCUMENTS

| | | |
|---|---|---|
| CN | 110022670 A | 7/2019 |
| DE | 20 2015 006 171 U1 | 11/2015 |
| DE | 20 2015 007 933 U1 | 1/2016 |
| DE | 10 2015 015 275 A1 | 6/2016 |
| DE | 10 2015 203 575 A1 | 9/2016 |
| DE | 10 2015 012 043 A1 | 3/2017 |
| DE | 20 2009 019 169 U1 | 8/2017 |
| DE | 10 2017 222 077 A1 | 9/2018 |
| EP | 3 031 315 A1 | 6/2016 |
| JP | 6357086 B2 | 7/2018 |
| JP | 6454522 B2 | 1/2019 |

\* cited by examiner

HAND-GUIDED GARDEN, FORESTRY AND/OR CONSTRUCTION WORKING APPARATUS AND METHOD FOR A HAND-GUIDED GARDEN, FORESTRY AND/OR CONSTRUCTION WORKING APPARATUS

CROSS REFERENCE TO RELATED APPLICATION

This application claims priority under 35 U.S.C. § 119 from European Patent Application No. 19205819.6, filed Oct. 29, 2019, the entire disclosure of which is herein expressly incorporated by reference.

BACKGROUND AND SUMMARY OF THE INVENTION

The invention relates to a hand-guided garden, forestry and/or construction working apparatus and to a method for such a hand-guided garden, forestry and/or construction working apparatus.

The problem on which the invention is based is to provide a hand-guided garden, forestry and/or construction working apparatus which has improved properties. Furthermore, the problem on which the invention is based is to provide a method for such a hand-guided garden, forestry and/or construction working apparatus.

The invention solves this problem by providing a hand-guided garden, forestry and/or construction working apparatus having the features of the claimed invention. Furthermore, the problem on which the invention is based is solved by a method having the features of the claimed invention.

The hand-guided, in particular electric, garden, forestry and/or construction working apparatus according to the invention has an inactive state, an active state, a variable or switchable setting, in particular which can be connected through, and an appliance operator control element which can be activated by a user. In or from the inactive state, the garden, forestry and/or construction working apparatus is designed or configured to be transferred, in particular automatically, into the active state triggered by activation of the appliance operator control element, in particular by a user. Furthermore, in the active state the garden, forestry and/or construction working apparatus is designed or configured to change, in particular automatically or to switch over the setting and not to be transferred into the inactive state triggered by in particular renewed or repeated and/or identical, in particular similar, activation of the appliance operator control element, in particular by the user.

This, in particular the variable setting, permits optimal adaptation of the garden, forestry and/or construction working apparatus to a working objective and/or to the user.

Furthermore, this permits for the user simple and intuitively comprehensible operator control of the garden, forestry and/or construction working apparatus. In particular, this can permit the user to be able to activate the appliance operator control element, in particular easily in order to transfer into the active state and/or to change the setting without the need to comply with an, in particular factory-set, specification with respect to the activation, in particular to a reaching of a minimum time period or undershooting of a maximum time period and/or a type of activation.

In particular, in the inactive state the garden, forestry and/or construction working apparatus can be designed to be transferred into the active state triggered by activation of the appliance operator control element irrespective of a time period and/or a type of activation. Additionally or alternatively, in the active state the garden, forestry and/or construction working apparatus can be designed to change the setting and not to be transferred into the inactive state triggered by activation of the appliance operator control element irrespective of a time period and/or a type of activation. As a further additional or alternative possibility, in or from the active state of the garden, forestry and/or construction working apparatus it may not be possible to transfer into the inactive state triggered by in particular different, in particular varied, activation of the appliance operator control element. As a further additional or alternative possibility, in the inactive state of the garden, forestry and/or construction working apparatus it may not be possible to change the setting triggered by activation of the appliance operator control element.

The inactive state and/or the active state and/or the setting can be different. Alternatively or additionally, the inactive state can be referred to as an off state and/or sleep state. As a further additional or alternative possibility, the active state can be referred to as an on state and/or awake state. As a further additional or alternative possibility, the setting can have in particular at least two, in particular at least three, different values, in particular which can be brought about by change. As a further additional or alternative possibility, the setting, in particular the values, can be predefined in particular at the factory.

The appliance operator control element can be referred to as a locking lever and/or as a lock-off device. Additionally or alternatively, the garden, forestry and/or construction working apparatus can have an, in particular electric, appliance switch. The appliance operator control element can be designed to activate the appliance switch. In the inactive state, the garden, forestry and/or construction working apparatus can be designed to be transferred into the active state triggered by activation of the appliance switch. Furthermore, in the active state the garden, forestry and/or construction working apparatus can be designed to change the setting and not to be transferred into the inactive state triggered by, in particular renewed or repeated and/or identical, in particular similar, activation of the appliance switch.

The hand-guided garden, forestry and/or construction working apparatus can be a ground-guided or hand-held garden, forestry and/or construction working apparatus. Additionally or alternatively, hand-guided, in particular hand-held, garden, forestry and/or construction working apparatus can mean that the garden, forestry and/or construction working apparatus can have a maximum mass of 50 kilograms (kg), in particular of 20 kg, in particular of 10 kg, in particular without a battery pack. As a further additional or alternative possibility, the garden, forestry and/or construction working apparatus can have an, in particular exchangeable, working tool.

In one development of the invention, the garden, forestry and/or construction working apparatus has an, in particular electric, drive motor and a motor operator control element which can be activated by a user. The drive motor is designed or configured to drive the garden, forestry and/or construction working apparatus. In the active state, the garden, forestry and/or construction working apparatus is designed or configured to operate the drive motor automatically in accordance with activation of the motor operator control element, in particular by the user. In particular, in the inactive state the garden, forestry and/or construction working apparatus is designed or configured not to operate the drive motor, irrespective of activation of the motor operator control element. Additionally or alternatively, the drive motor can be designed to drive the working tool. As a further additional or alternative possibility, the motor operator control element can be different from the apparatus operator control element. As a further additional or alternative possibility, the motor operator control element can be referred to as a switching lever and/or as a power switch. As a further additional or alternative possibility, the garden, forestry and/or construction working apparatus can have an, in particular electric, motor switch and/or an, in particular electric, motor potentiometer. The motor operator control element can be designed to activate, in particular to move, the motor switch and/or the motor potentiometer. In the active state, the garden, forestry and/or construction working apparatus can be designed to operate the drive motor in accordance with activation, in particular a movement, of the motor switch and/or of the motor potentiometer. As a further additional or alternative possibility, the apparatus operator control element and the motor operator control element, in particular an activation of the apparatus operator control element and an activation of the motor operator control element, do not need to or cannot interact mechanically with one another, in particular directly or indirectly.

In one embodiment of the invention, in the active state the garden, forestry and/or construction working apparatus is designed or configured not to change the setting when the motor operator control element is activated, in particular irrespective of activation of the apparatus operator control element. In particular, the garden, forestry and/or construction working apparatus is, in particular in the active state, designed or configured to change the setting when the motor operator control element is not activated, in particular triggered by activation of the apparatus operator control element. This makes it possible to avoid unintentional changing of the setting when the motor operator control element is activated. In particular, the garden, forestry and/or construction working apparatus, in particular in the active state, can be designed to change the setting when the drive motor coasts to a stop.

In one embodiment of the invention, the garden, forestry and/or construction working apparatus is designed or configured, if the motor operator control element is activated, in particular unintentionally, before the garden, forestry and/or construction working apparatus is transferred, in particular unintentionally, in particular from the inactive state into the active state, not to operate the drive motor. In particular, the garden, forestry and/or construction working apparatus is designed or configured, if the motor operator control element is activated, in particular intentionally, to operate the drive motor after the garden, forestry and/or construction working apparatus is transferred into the active state, in particular intentionally. This permits the risk of damage caused by unintentional operation of the drive motor to be reduced or even avoided.

In one embodiment of the invention, the garden, forestry and/or construction working apparatus has a handle and a presence-detection element which is different from the motor operator control element and can, in particular, be activated by the user. The presence-detection element is designed or configured to detect, in particular automatically, the presence of a hand, in particular of the user, on the handle. In the active state, the garden, forestry and/or construction working apparatus is designed or configured to operate the drive motor in accordance with detection by means of the presence-detection element. This permits the risk of damage caused by unintentional operation of the drive motor to be reduced or even avoided. In particular, the handle can be designed to guide, in particular to hold, the garden, forestry and/or construction working apparatus. Additionally or alternatively, the motor operator control element and/or the presence-detection element can be arranged on the handle. As a further additional or alternative possibility, the presence-detection element can be different from the apparatus operator control element. As a further additional or alternative possibility, the presence-detection element can be referred to as an operator presence sensor and/or operator presence sensor circuit. As a further additional or alternative possibility, the garden, forestry and/or construction working apparatus can have an, in particular electric, presence switch. The presence-detection element can be designed to activate the presence switch. In the active state, the garden, forestry and/or construction working apparatus can be designed to operate the drive motor in accordance with activation of the presence switch. As a further additional or alternative possibility, the presence-detection element can be designed to be activated by the hand on the handle, in particular by gripping of the handle by the hand. In the active state, the garden, forestry and/or construction working apparatus can be designed to operate the drive motor in accordance with activation of the presence-detection element. As a further additional or alternative possibility the apparatus operator control element and the presence-detection element, in particular an activation of the apparatus operator control element and detection, in particular activation, by means of the presence-detection element, do not need to or cannot mechanically interact with one another, in particular directly or indirectly.

In one embodiment of the invention, the motor operator control element is embodied or configured as a motor operator control element which can be moved by a user. The garden, forestry and/or construction working apparatus, in particular the presence-detection element, is embodied or configured to, in particular automatically and/or mechanically, lock a movement of the motor operator control element, in particular if the motor operator control element is not moved, in the case of non-detection by means of the presence-detection element. This makes it possible for the user to carry out simple and intuitively comprehensible operator control of the garden, forestry and/or construction working apparatus. In particular, the motor operator control element can be embodied as a pushbutton operator control element. Additionally or alternatively, in the active state, the garden, forestry and/or construction working apparatus can be designed to operate the drive motor in accordance with a movement of the motor operator control element. As a further additional or alternative possibility, the presence-detection element can be referred to as a gear lever lock. As a further additional or alternative possibility, the garden, forestry and/or construction working apparatus, in particular the presence-detection element, can be designed to, in particular automatically and/or mechanically, release a movement of the motor operator control element in the case of detection by means of the presence-detection element.

In one development, in particular one embodiment, of the invention, the apparatus operator control element and the motor operator control element are arranged for simultaneous activation by a, in particular the, hand, in particular of the user, and in particular the presence-detection element, insofar as one is present, is arranged for simultaneous detection of the presence of the hand. This permits single-handed operator control of the garden, forestry and/or construction working apparatus, in particular of the apparatus operator control element and of the motor operator control element, and in particular of the presence-detection element. In particular, the apparatus operator control element and/or the motor operator control element and/or the presence-detection element can be arranged on the handle.

In one development, in particular one embodiment, of the invention, the apparatus operator control element is embodied or configured as an apparatus operator control element which can be moved by a user. The garden, forestry and/or construction working apparatus has an apparatus resetting element. The apparatus resetting element is designed or configured to apply force to the apparatus operator control element for the purpose of resetting a movement of the apparatus operator control element, in particular from a, in particular single, activation position to a non-activation position. Additionally or alternatively, the motor operator control element, insofar as one is present, is embodied or configured as a, in particular the, motor operator control element which can be moved by a user. The garden, forestry and/or construction working apparatus has a motor-resetting element. The motor-resetting element is designed or configured to apply force to the motor operator control element for the purpose of resetting a movement of the motor operator control element, in particular from at least one activation position into a non-activation position. Additionally or alternatively, the presence-detection element, insofar as one is present, is embodied or configured as a presence-detection element which can be moved by a user. The garden, forestry and/or construction working apparatus has a detection-resetting element. The detection-resetting element is designed or configured to apply force to the presence-detection element for the purpose of resetting a movement of the presence-detection element, in particular from an, in particular single, activation position, in particular a release position, into a non-activation position, in particular a locking position. This permits the renewed or repeated and/or identical, in particular similar, activation or movement of the apparatus operator control element. Additionally or alternatively, this makes it possible that the garden, forestry and/or construction working apparatus does not have to be or cannot be designed to engage and/or mechanically secure the apparatus operator control element in the activation position, in particular an activation position. This therefore permits a simple design of the garden, forestry and/or construction working apparatus. As a further additional or alternative possibility this makes it possible that the garden, forestry and/or construction working apparatus can end an operation of the drive motor autonomously or independently or automatically after the moved motor operator control element and/or the moved presence-detection element is released. This therefore permits the risk of damage caused by operation of the drive motor to be reduced or even avoided and/or permits a high level of safety for the user. In particular, the apparatus operator control element and/or the motor operator control element and/or the presence-detection element can, in particular each, be designed as a pushbutton operator control element. Additionally or alternatively, in the inactive state, the garden, forestry and/or construction working apparatus can be designed to be transferred into the active state and/or in the active state the garden, forestry and/or construction working apparatus can be designed to change the setting triggered by a movement of the apparatus operator control element. Additionally or alternatively, in the active state, the garden, forestry and/or construction working apparatus can be designed to operate the drive motor in accordance with a movement of the motor operator control element. As a further additional or alternative possibility, in the active state, the garden, forestry and/or construction working apparatus can be designed to operate the drive motor in accordance with a movement of the presence-detection element. As a further additional or alternative possibility, the apparatus-resetting element and/or the motor-resetting element and/or the detection-resetting element can, in particular each, have a spring, in particular can be a spring. As a further additional or alternative possibility, the apparatus switch and/or the motor switch and/or the motor potentiometer and/or the presence switch can, as far as they are present, in particular each, be embodied in a self-resetting fashion.

In one development, in particular one embodiment, of the invention, in or from the active state, the garden, forestry and/or construction working apparatus is designed or configured to be autonomously or independently or automatically transferred into the inactive state, in particular without the user. In particular, triggered by the expiry or reaching of an, in particular first and/or factory-set, predefined time period since an, in particular last, transfer, in particular a starting of the transfer, into the active state when the apparatus operator control element is not activated and/or the motor operator control element, insofar as one is present, is not activated and/or in the case of non-detection by means of the presence-detection element, insofar as one is present. Additionally or alternatively, in particular triggered by the expiry or reaching of an, in particular second, in particular further and/or factory-set, predefined time period, different from the first, since an end of an, in particular last, activation of the apparatus operator control element and/or an, in particular last, activation of the motor operator control element, insofar as one is present, and/or an, in particular last, detection by means of the presence-detection element, insofar as one is present, in the active state. Additionally or alternatively, in particular triggered by non-activation of the motor operator control element, in particular directly after, in particular an end of an, in particular last, activation of the motor operator control element and/or non-detection by means of the presence-detection element, in particular directly after, in particular an end of an, in particular last, detection by means of the presence detection element, in the active state. This makes it possible that in the active state the garden, forestry and/or construction working apparatus does not have to be designed to be transferred into the inactive state triggered by activation of the apparatus operator control element. In particular, the, in particular respective, time period can be greater than zero, in particular at a minimum of 0.5 seconds (s) and/or maximum of 10 s.

In one development of the invention, the garden, forestry and/or construction working apparatus has an, in particular the and/or electric, drive motor. The drive motor is designed or configured to drive the garden, forestry and/or construction working apparatus. The setting is an operational setting for the purpose of operating the drive motor. This makes it possible to perform optimum adaptation of the drive motor to a working task and/or to the user. In particular, the drive motor can be designed to drive the working tool.

In one embodiment of the invention, the operational setting has, in particular at least two, in particular at least three, different maximum rotational speeds, in particular at least two, in particular at least three, different rotational speed ranges, in particular at least two, in particular at least three, different motor operator control element activation rotational-speed characteristic curves, in particular at least two, in particular at least three, different maximum power levels and/or, in particular at least two, in particular at least three, different operating modes of the drive motor. In particular, the garden, forestry and/or construction working apparatus can have the, in particular moveable, motor operator control element. The motor operator control element activation rotational-speed characteristic curves can, in particular each, be defined by an assignment of a respective rotational speed to a respective activation, in particular a respective movement, in particular a respective position, of the motor operator control element, in particular of the motor potentiometer, insofar as one is present.

In one development of the invention, the garden, forestry and/or construction working apparatus is a saw, an, in particular short, pole-mounted power pruner, in particular with a rotatable transmission, or a spacer, a brush cutter, hedge clippers, hedge cutters, a blower, a leaf blowing machine, branch shears, an angle grinder, a sweeper, a sweeper roller, a sweeping brush, a lawnmower, a scarifier, grass trimmers, a circular shear or an olive harvester.

In one development, in particular one embodiment, of the invention, the garden, forestry and/or construction working apparatus has an, in particular electric, output device. In particular, in the active state of the garden, forestry and/or construction working apparatus, the output device is designed or configured to, in particular automatically, output information, in particular information which can be perceived by a user, about the active state, the setting, activation of the motor operator control element, insofar as one is present, in particular before a transfer of the garden, forestry and/or construction working apparatus into the active state, and/or detection by means of the presence-detection element, insofar as one is present. This permits feedback for the user, in particular regarding an inappropriate operator control operation or an incorrect operator control operation of the garden, forestry and/or construction working apparatus by the user. In particular, the output device can have, in particular be, a display. Additionally or alternatively, in the inactive state of the garden, forestry and/or construction working apparatus the output device does not have to or can be designed to not output the information.

In one development, in particular one embodiment, of the invention, the garden, forestry and/or construction working apparatus has an, in particular electric, control device. The control device has the inactive state, the active state and the variable setting. In particular in the active state the control device is designed or configured to, in particular automatically, control the drive motor, insofar as one is present and in the non-active state is designed or configured not to control the drive motor.

In particular, the control device can have a microcontroller and/or the apparatus switch and/or the motor switch and/or the motor potentiometer and/or the presence switch, insofar as one is present. Additionally or alternatively, in the inactive state the control device can be designed to be transferred into the active state triggered by activation of the apparatus operator control element. Furthermore, in the active state the control device can be designed to change the setting and not to be transferred into the inactive state triggered by activation of the apparatus operator control element.

The method according to the invention for an, in particular the, hand-guided garden, forestry and/or construction working apparatus as described above has the steps: a) in or from the inactive state of the garden, forestry and/or construction working apparatus, in particular automatic, transfer into the active state triggered by activation of the apparatus operator control element, in particular by the user. b) In the active state of the garden, forestry and/or construction working apparatus, in particular automatic, changing or switching of the setting and non-transferring into the inactive state triggered by, in particular renewed or repeated and/or identical, in particular similar, activation of the apparatus operator control element, in particular by the user. In particular, the step b) can be carried out after step a). Additionally or alternatively, step b) can be carried out, in particular several times, in a repeated fashion. As a further additional or alternative possibility, the method does not need to have a step: in or from the active state of the garden, forestry and/or construction working apparatus, transfer into the inactive state triggered by in particular different, in particular varied, activation of the apparatus operator control element. As a further alternative or additional possibility, the method does not need to have a step: in the inactive state of the garden, forestry and/or construction working apparatus, changing the setting triggered by activation of the apparatus operator control element.

Other objects, advantages and novel features of the present invention will become apparent from the following detailed description of one or more preferred embodiments when considered in conjunction with the accompanying drawings.

DETAILED DESCRIPTION OF THE DRAWINGS

FIGS. 1 to 4 show a hand-guided garden, forestry and/or construction working apparatus 1. The garden, forestry and/or construction working apparatus 1 has an inactive state off, an active state on, a variable setting EI and an apparatus operator control element 2 which can be activated by a user. In the inactive state off, the garden, forestry and/or construction working apparatus 1 is designed to be transferred into the active state on triggered by activation of the apparatus operator control element 2, as shown by an arrow in FIG. 2A to FIG. 2B. Furthermore, in the active state on the garden, forestry and/or construction working apparatus 1 is designed to change the setting EI and not to be transferred into the inactive state off triggered by activation of the apparatus operator control element 2, as shown by arrows in FIG. 3B.

In detail, the garden, forestry and/or construction working apparatus has an, in particular electric, control device 11. The control device 11 has the inactive state off, the active state on and the variable setting EI.

The method for the hand-guided garden, forestry and/or construction working apparatus 1 has the steps: a) In the inactive state off of the garden, forestry and/or construction working apparatus 1, in particular of the control device 11, transfer into the active state on triggered by activation of the apparatus operator control element 2. b) In the active state on of the garden, forestry and/or construction working apparatus, in particular of the control device 11, changing of the setting EI and non-transferring into the inactive state off triggered by activation of the apparatus operator control element 2.

In detail, the garden, forestry and/or construction working apparatus 1 has an, in particular electric, drive motor 3. The drive motor 3 is designed to drive the garden, forestry and/or construction working apparatus 1.

In particular, in the active state on the control device 11 is designed to control the drive motor 3, and in the non-active state off is designed not to control the drive motor 3.

In the exemplary embodiment shown, the garden, forestry and/or construction working apparatus 1 is designed to electrically connect to a battery pack 20 for supplying the garden, forestry and/or construction working apparatus 1, in particular the control device 11 and/or the drive motor 3, with electrical drive power AL from the battery pack 20.

In particular, the garden, forestry and/or construction working apparatus 1 has a battery receptacle 21. The battery receptacle 21 is designed to accommodate the battery pack 20.

Figure 1:
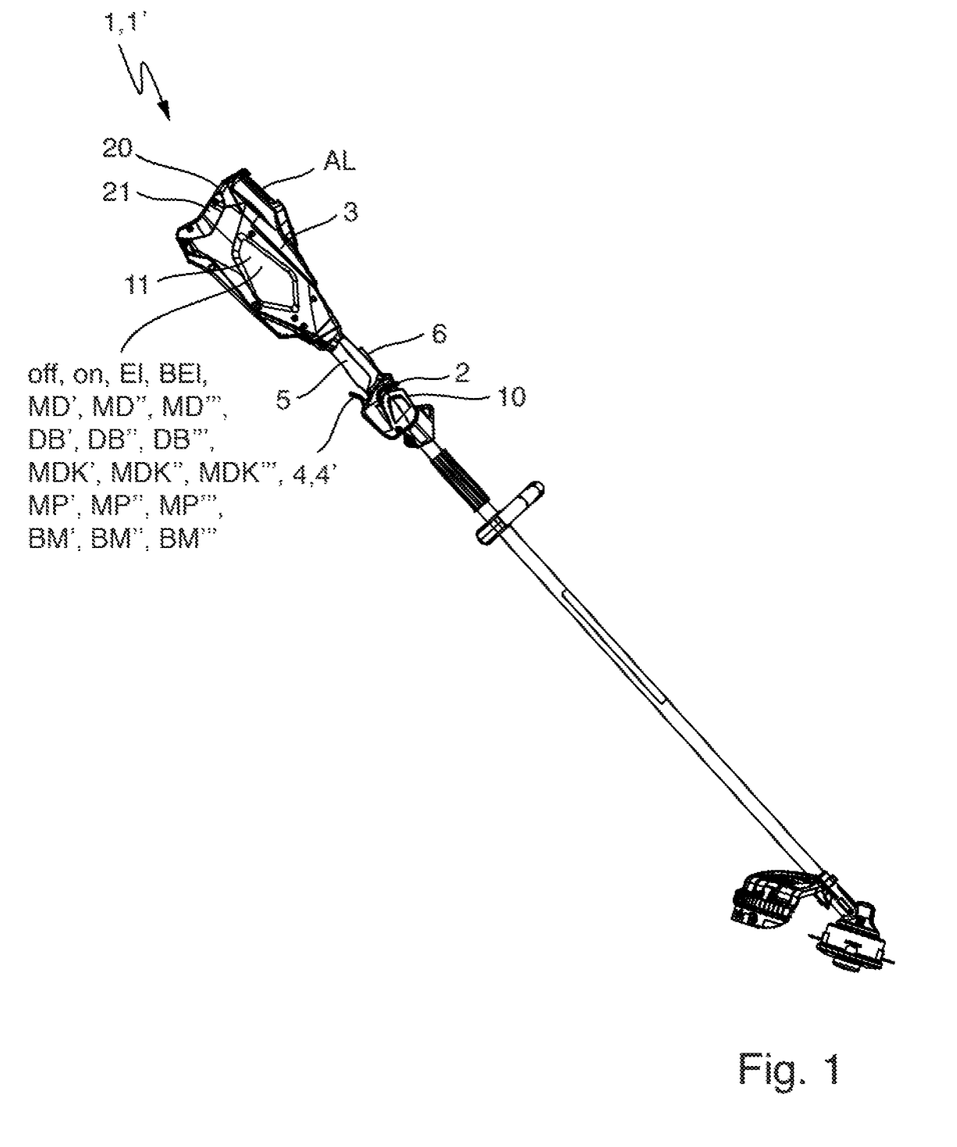
FIG. 1 shows a perspective view of a hand-guided garden, forestry and/or construction working apparatus according to an embodiment of the invention.

In FIG. 1, the garden, forestry and/or construction working apparatus 1 and the battery pack 20 are electrically connected to one another. In particular, the battery receptacle 21 has accommodated the battery pack 20.

If the garden, forestry and/or construction working apparatus 1 and the battery pack 20 are not electrically connected to one another, the garden, forestry and/or construction working apparatus 1, in particular the control device 11, is in the inactive state off, and in particular does not need to or cannot be in the active state on.

Furthermore, in the active state on the garden, forestry and/or construction working apparatus 1, in particular the control device 11, is designed to store and use the last setting EI, in particular so that the last setting EI cannot be lost by the inactive state off, in particular as a result of non-electrical connection to the battery pack 20.

Figure 4:
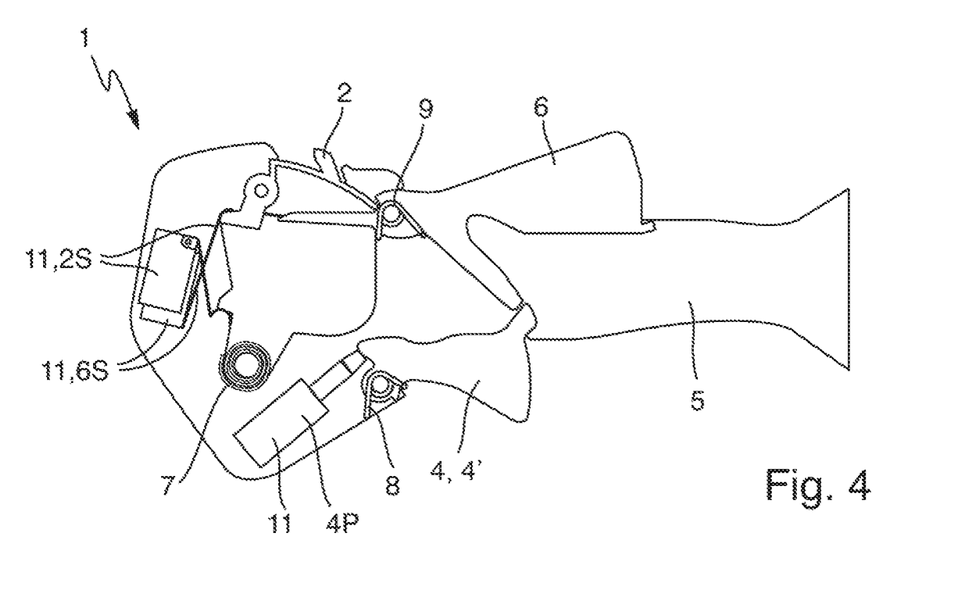
FIG. 4 shows a sectional view of the detail of the garden, forestry and/or construction working apparatus in FIG. 1.

Furthermore, the garden, forestry and/or construction working apparatus 1, in particular the control device 11, has an, in particular electrical, apparatus switch 2S, as shown in FIG. 4. The apparatus operator control element 2 is designed to activate the apparatus switch 2S. In the inactive state off, the garden, forestry and/or construction working apparatus 1, in particular the control device 11, is designed to be transferred into the active state on triggered by activation of the apparatus switch 2S. Furthermore, in the active state on the garden, forestry and/or construction working apparatus 1, in particular the control device 11, is designed to change the setting EI and not to be transferred into the inactive state off triggered by activation of the apparatus switch 2S.

Furthermore, the garden, forestry and/or construction working apparatus 1 has a motor operator control element 4 which can be activated by a user. In the active state on, the garden, forestry and/or construction working apparatus 1, in particular the control device 11, is designed to operate the drive motor 3 in accordance with activation of the motor operator control element 4.

In particular, in the inactive state off the garden, forestry and/or construction working apparatus 1, in particular the control device 11, is designed not to operate the drive motor 3 irrespective of activation of the motor operator control element 4.

In the exemplary embodiment shown, the garden, forestry and/or construction working apparatus 1, in particular the control device 11, has an, in particular electric, motor potentiometer 4P, as shown in FIG. 4. The motor operator control element 4 is designed to activate, in particular to move, the motor potentiometer 4P. In the active state on, the garden, forestry and/or construction working apparatus 1, in particular the control device 11, is designed to operate the drive motor 3 in accordance with activation, in particular a movement, of the motor potentiometer 4P.

In detail, the garden, forestry and/or construction working apparatus 1, in particular the control device 11, is designed not to change the setting EI when the motor operator control element 4 is activated.

In particular, the garden, forestry and/or construction working apparatus 1, in particular the control device 11, is designed to change the setting EI when the motor operator control element 4 is not activated.

In addition, the garden, forestry and/or construction working apparatus 1, in particular the control device 11, is designed, if the motor operator control element 4 is activated, before the garden, forestry and/or construction working apparatus 1, in particular the control device 11, is transferred into the active state on, not to operate the drive motor 3.

In particular, the garden, forestry and/or construction working apparatus 1, in particular the control device 11, is designed, if the motor operator control element 4 is activated, to operate the drive motor 3 after the garden, forestry and/or construction working apparatus 1, in particular the control device 11, is transferred into the active state on.

Furthermore, the garden, forestry and/or construction working apparatus 1 has a handle 5 and a presence-detection element 6 which is different from the motor operator control element 4 and can in particular be activated by a user. The presence-detection element 6 is designed to detect the presence of a hand, in particular for the purpose of activation by a hand, on the handle 5. In the active state on, the garden, forestry and/or construction working apparatus 1, in particular the control device 11, is designed to operate the drive motor 3 in accordance with detection by means of the presence-detection element 6, in particular of activation of the presence-detection element 6.

In the exemplary embodiment shown, the garden, forestry and/or construction working apparatus 1, in particular the control device 11, has an, in particular electric, presence switch 6S, as shown in FIG. 4. The presence-detection element 6 is designed to activate the presence switch 6S. In the active state on, the garden, forestry and/or construction working apparatus 1, in particular the control device 11, is designed to operate the drive motor 3 in accordance with activation of the presence switch 6S.

In detail, the motor operator control element 4 is embodied as a motor operator control element 4' which can be moved by a user.

Furthermore, the garden, forestry and/or construction working apparatus 1, in particular the presence-detection element 6, is designed to, in particular mechanically, lock a movement of the motor operator control element 4' in the case of non-detection by means of the presence-detection element 6, in particular in the case of non-activation of the presence-detection element 6, as shown in FIG. 4.

Figure 2A:
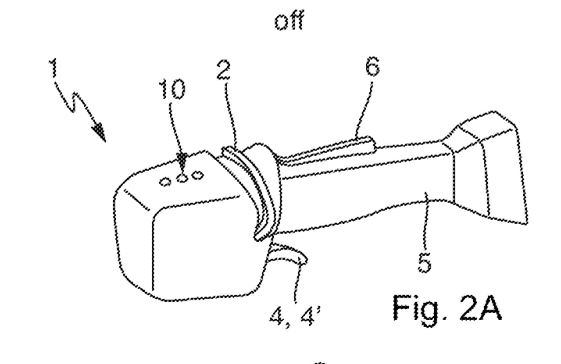
FIG. 2A shows a perspective view of a detail of the garden, forestry and/or construction working apparatus in FIG. 1 in an inactive state and of an exemplary method for the garden, forestry and/or construction working apparatus in FIG. 1.
Figure 2B:
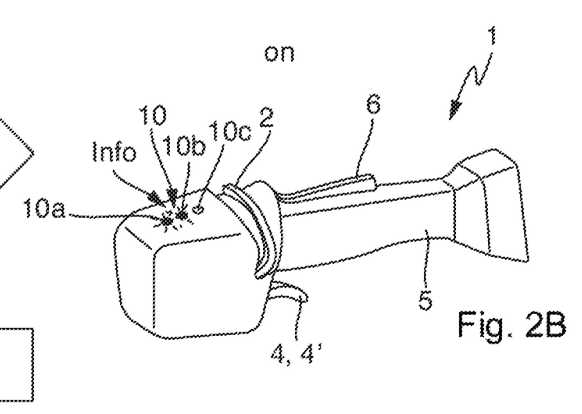
FIG. 2B shows a further perspective view of the detail of the garden, forestry and/or construction working apparatus in FIG. 1, which has been transferred into an active state triggered by activation of an apparatus operator control element of the garden, forestry and/or construction working apparatus in FIG. 1, and the method.
Figure 2C:
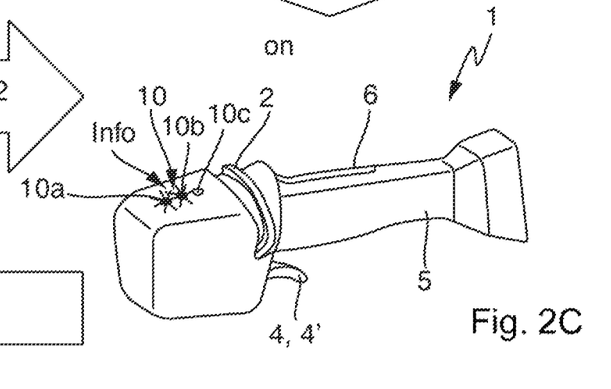
FIG. 2C shows a further perspective view of the detail of the garden, forestry and/or construction working apparatus in FIG. 1 in the active state when a presence-detection element of the garden, forestry and/or construction working apparatus in FIG. 1 and the method have been activated.
Figure 2D:
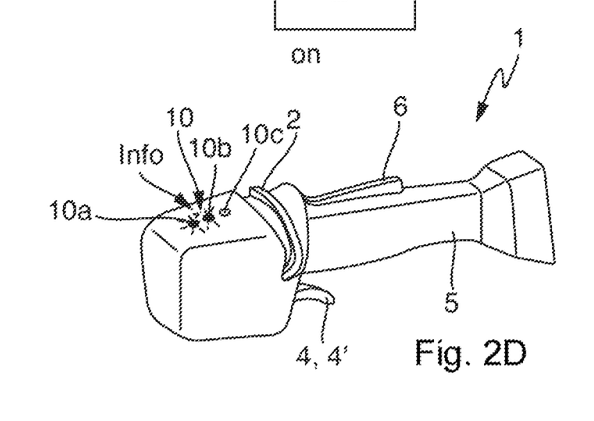
FIG. 2D shows a further perspective view of the detail of the garden, forestry and/or construction working apparatus in FIG. 1 in the active state after activation of the presence-detection element and of the method.

In particular, the garden, forestry and/or construction working apparatus 1, in particular the presence-detection element 6, is designed to, in particular mechanically, release a movement of the motor operator control element 4' in the case of detection by means of the presence-detection element 6, in particular when the presence-detection element 6 is activated, as shown by an arrow from FIG. 2B to FIG. 2C and by an arrow from FIG. 2D to FIG. 2C.

Therefore, in the exemplary embodiment shown the motor operator control element 4, 4' and the presence-detection element 6, in particular an activation, in particular a movement, of the motor operator control element 4, 4' and detection by means of, in particular activation, of the presence-detection element 6, interact mechanically with one another, in particular directly. In addition, in the exemplary embodiment shown the apparatus operator control element 2, the motor operator control element 4, 4' and the presence-detection element 6, in particular an activation of the apparatus operator control element 2, an activation, in particular a movement, of the motor operator control element 4, 4' and detection by means of, in particular activation, of the presence-detection element 6, interact electrically with one another, in particular by means of the control device 11. In alternative exemplary embodiments, the motor operator control element and the presence-detection element, in particular an activation, in particular a movement, of the motor operator control element and detection by means of, in particular activation, of the presence-detection element, in particular by means of the control device 11, interact with one another only electrically and/or do not need to or cannot interact with one another mechanically.

Furthermore, the apparatus operator control element 2 and the motor operator control element 4 are arranged for simultaneous activation by the hand, and in particular the presence-detection element 6 is arranged for simultaneous detection of the presence of the hand.

In the exemplary embodiment shown, the apparatus operator control element 2, the motor operator control element 4 and the presence-detection element 6 are arranged on the handle 5.

Figure 3A:
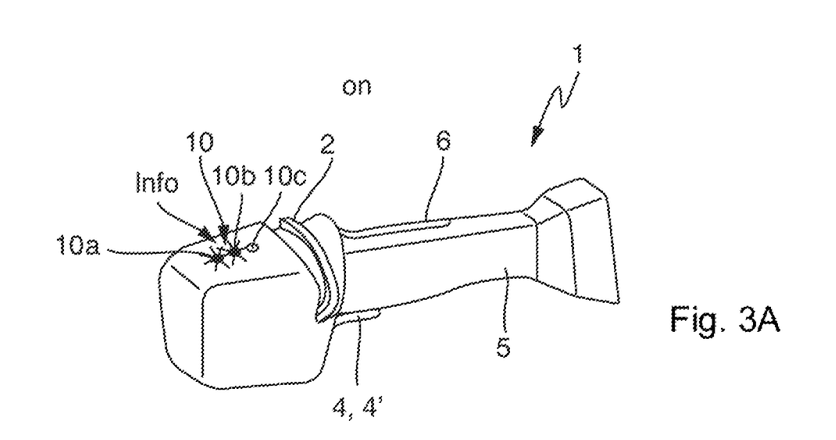
FIG. 3A shows a further perspective view of the detail of the garden, forestry and/or construction working apparatus in FIG. 1 in the active state when a drive motor of the garden, forestry and/or construction working apparatus in FIG. 1 is operating when a motor operator control element of the garden, forestry and/or construction working apparatus in FIG. 1 and the method have been activated.
Figure 3B:
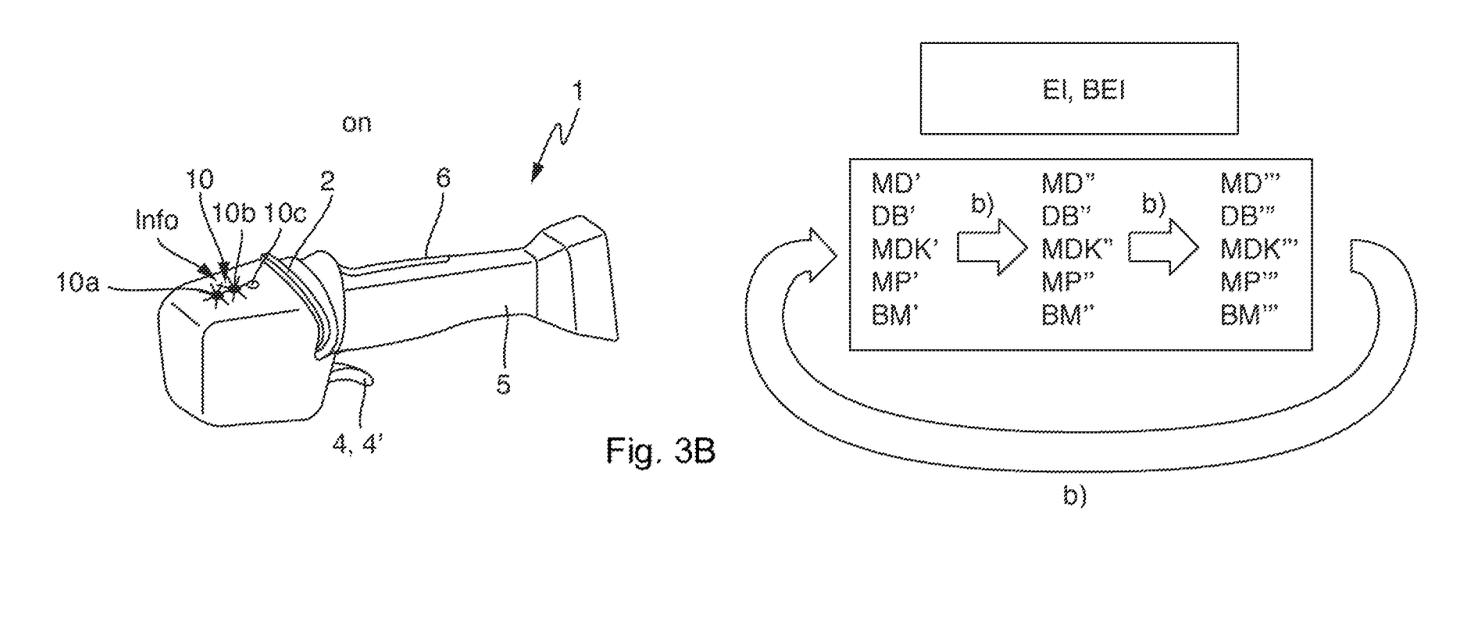
FIG. 3B shows a further perspective view of the detail of the garden, forestry and/or construction working apparatus in FIG. 1 in the active state when a setting of the garden, forestry and/or construction working apparatus in FIG. 1 is changed, triggered by activation of the apparatus operator control element and of the method.

In addition, the apparatus operator control element 2 is embodied as an apparatus operator control element 2' which can be moved by a user. The garden, forestry and/or construction working apparatus 1 has an apparatus-resetting element 7, in the form of a helical spring in the exemplary embodiment shown, as shown in FIG. 4. The apparatus-resetting element 7 is designed to apply force to the apparatus operator control element 2' for the purpose of resetting a movement of the apparatus operator control element 2', in particular from an activation position, as shown in FIG. 3B, into a non-activation position, as shown in FIGS. 1 to 3A and 4.

In addition, the motor operator control element 4 is embodied as the motor operator control element 4' which can be moved by a user. The garden, forestry and/or construction working apparatus 1 has a motor-resetting element 8, in the form of a helical spring in the exemplary embodiment shown, as shown in FIG. 4. The motor-resetting element 8 is designed to apply force to the motor operator control element 4' for the purpose of resetting a movement of the motor operator control element 4', in particular from at least one activation position, as shown in FIG. 3A, into a non-activation position, as shown in FIGS. 1, 2, 3B and 4.

In addition, the presence-detection element 6 is embodied as a presence-detection element 6' which can be moved by a user. The garden, forestry and/or construction working apparatus 1 has a detection-resetting element 9, in the form of a helical spring in the exemplary embodiment shown, as shown in FIG. 4. The detection-resetting element 9 is designed to apply force to the presence-detection element 6' for the purpose of resetting a movement of the presence-detection element 6', in particular from an activation position, as shown in FIGS. 2C and 3, into a non-activation position, as shown in FIGS. 1, 2A, 2B, 2C and 4.

In particular, the apparatus switch 2S, the motor potentiometer 4P and the presence switch 6S are, in particular each, embodied in a self-resetting fashion.

Furthermore, in the active state on the garden, forestry and/or construction working apparatus 1, in particular the control device 11, is designed to be independently transferred into the inactive state off.

In particular triggered by the expiry of an, in particular first, predefined time period t1, of 5 s in the exemplary embodiment shown, since a transfer into the active state on when the apparatus operator control element 2 is not activated and/or in the case of non-detection by means of the presence-detection element 6, as shown by an arrow from FIG. 2B to FIG. 2A. In alternative exemplary embodiments, triggered by the expiry of the predefined time period since a transfer into the active state when the motor operator control element is not activated, in particular if the presence-detection element is not present.

Additionally or alternatively, in particular triggered by the expiry of an, in particular second, predefined time period t2, of 1 s in the exemplary embodiment shown, since an end of an activation of the apparatus operator control element 2 and/or detection by means of the presence-detection element 6 in the active state on, as shown by an arrow from FIG. 2D to FIG. 2A, and by the arrow from FIG. 2D to FIG. 2C. In alternative exemplary embodiments, triggered by the expiry of the predefined time period since an end of an activation of the motor operator control element in the active state, in particular if the presence-detection element is not present. In alternative exemplary embodiments, triggered by non-activation of the motor operator control element after activation of the motor operator control element and/or non-detection by means of the presence-detection element after detection by means of the presence-detection element in the active state, in particular if the, in particular each, predefined time period is not present.

Furthermore, the setting EI is an operational setting BEI for operating the drive motor 3.

In detail, the operational setting BEI has in particular three different maximum rotational speeds MD', MD", MD''', in particular three different rotational speed ranges DB', DB", DB''', in particular three different motor operator control element activation rotational-speed characteristic curves MDK', MDK", MDK''', in particular three different maximum power levels MP', MP", MP''', and in particular three different operating modes BM', BM", BM''' of the drive motor 3.

In the exemplary embodiment shown, the operational setting BEI has the different operating modes BM', BM", BM'". The different operating modes BM', BM", BM'" have the different maximum rotational speeds MD', MD", MD'", the different rotational speed ranges DB', DB", DB'", the different motor operator control element activation rotational-speed characteristic curves MDK', MDK", MDK'" and the different maximum power levels MP', MP", MP'".

Furthermore, in the exemplary embodiment shown, the garden, forestry and/or construction working apparatus 1 is a brush cutter 1'. In alternative exemplary embodiments, the garden, forestry and/or construction working apparatus can be a saw, a pole-mounted power pruner, hedge clippers, hedge cutters, a blower, a leaf blowing machine, branch shears, an angle grinder, a sweeper, a sweeper roller, a sweeping brush, a lawnmower, a scarifier, grass trimmers, a circular shear or an olive harvester.

In addition, the garden, forestry and/or construction working apparatus 1 has an, in particular electric, output device 10, in the exemplary embodiment in the form of in particular three light-emitting diodes 10a, 10b, 10c. The output device 10 is designed, in particular in the active state on of the garden, forestry and/or construction working apparatus 1, in particular of the control device 11, to output information Info about the active state on, the setting EI, activation of the motor operator control element 4, in particular before a transfer of the garden, forestry and/or construction working apparatus 1, in particular of the control device 11, into the active state on, and detection by means of the presence-detection element 6.

In the inactive state off shown in FIG. 2A, the light-emitting diodes 10a, 10b, 10c are off or are not continuously flashing or illuminated. In the active state on shown in FIGS. 2B and 2D with, in particular in each case, running time periods t1, t2, the light-emitting diodes 10a, 10b of the in particular last or current setting EI, in particular of the last maximum rotational speed MD" of the last rotational speed range DB", of the last motor operator control element activation rotational-speed characteristic curve MDK", of the last maximum power level MP" and of the last operating mode BM" flash. In the active state on shown in FIGS. 2C, 3A and 3B, in the case of detection by means of the presence-detection elements 6 the light-emitting diodes 10a, 10b of the, in particular last or current, setting EI are illuminated continuously. If the motor operator control element 4 is activated before the garden, forestry and/or construction working apparatus 1, in particular the control device 11, is transferred into the active state on, the light-emitting diodes 10a, 10b of the, in particular last or current, setting EI are illuminated continuously, but the drive motor 3 is not operated.

In detail, the control device 11 is designed to control the output device 10.

As is made clear by the exemplary embodiments shown and described above, the invention provides a hand-guided garden, forestry and/or construction working apparatus which has improved properties. Furthermore, the invention provides a method for such a hand-guided garden, forestry and/or construction working apparatus.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hand-guided garden, forestry and/or construction working apparatus, comprising:
   an apparatus operator control element which is activatable by a user,
   wherein the garden, forestry and/or construction working apparatus has an inactive state, an active state and a variable setting;
   a drive motor, wherein the drive motor is configured to drive the garden, forestry and/or construction working apparatus; and
   a motor operator control element which is activatable by a user,
   wherein, in the inactive state, the garden, forestry and/or construction working apparatus is configured to be transferred into the active state triggered by activation of the apparatus operator control element,
   wherein, in the active state, the garden, forestry and/or construction working apparatus is configured to change the variable setting and not to be transferred into the inactive state triggered by the activation of the apparatus operator control element,
   wherein, in the active state, the garden, forestry and/or construction working apparatus is configured to operate the drive motor in accordance with activation of the motor operator control element, and, in the inactive state, is configured not to operate the drive motor irrespective of the activation of the motor operator control element,
   wherein the garden, forestry and/or construction working apparatus is configured not to change the variable setting when the motor operator control element is activated, and is configured to change the variable setting when the motor operator control element is not activated.

2. The hand-guided garden, forestry and/or construction working apparatus according to claim 1, further comprising:
   a handle; and
   a presence-detection element which is different from the motor operator control element, wherein the presence-detection element detects a presence of a hand on the handle,
   wherein, in the active state, the garden, forestry and/or construction working apparatus is configured to operate the drive motor in accordance with detection of the hand by the presence-detection element.

3. The hand-guided garden, forestry and/or construction working apparatus according to claim 2, wherein
   the motor operator control element is embodied as a motor operator control element which is movable by a user, and
   the garden, forestry and/or construction working apparatus is configured to lock a movement of the motor operator control element if the motor operator control element is not moved in the case of non-detection by the presence-detection element.

4. The hand-guided garden, forestry and/or construction working apparatus according to claim 2, wherein
   the apparatus operator control element and the motor operator control element are arranged for simultaneous activation by a hand, and
   the presence-detection element is arranged for simultaneous detection of the presence of the hand.

5. The hand-guided garden, forestry and/or construction working apparatus according to claim 2, wherein one or more of:
   (i) the apparatus operator control element is embodied as an apparatus operator control element which is movable by a user, and wherein the garden, forestry and/or construction working apparatus has an apparatus resetting element, wherein the apparatus resetting element is configured to apply force to the apparatus operator control element in order to reset a movement of the apparatus operator control element, (ii) the motor operator control element is embodied as a motor operator control element which is movable by a user, and wherein the garden, forestry and/or construction working apparatus has a motor-resetting element, wherein the motor-resetting element is configured to apply force to the motor operator control element in order to reset a movement of the motor operator control element, and (iii) the presence-detection element is embodied as a presence-detection element which is movable by a user, and wherein the garden, forestry and/or construction working apparatus has a detection-resetting element, wherein the detection-resetting element is configured to apply force to the presence-detection element in order to reset a movement of the presence-detection element.

6. The hand-guided garden, forestry and/or construction working apparatus according to claim 5, wherein
in the active state, the garden, forestry and/or construction working apparatus is configured to be transferred automatically into the inactive state, by one or more of:
(i) being triggered by expiration of a first, predefined time period since transfer into the active state when: the apparatus operator control element is not activated, the motor operator control element is not activated, and/or in case of non-detection by the presence-detection element,
(ii) being triggered by expiration of a second, predefined time period since an end of an activation of the apparatus operator control element and/or activation of the motor operator control element and/or detection by the presence-detection element in the active state, and
(iii) being triggered by non-activation of the motor operator control element after activation of the motor operator control element and/or non-detection by the presence-detection element after detection by the presence-detection element in the active state.

7. The hand-guided garden, forestry and/or construction working apparatus according to claim 1, wherein
the garden, forestry and/or construction working apparatus has a drive motor, wherein the drive motor is configured to drive the garden, forestry and/or construction working apparatus, and
the variable setting is an operational setting for operating the drive motor.

8. The hand-guided garden, forestry and/or construction working apparatus according to claim 7, wherein
the operational setting has different maximum rotational speeds, different rotational speed ranges, different motor operator control element activation rotational-speed characteristic curves, different maximum power levels and/or different operating modes of the drive motor.

9. The hand-guided garden, forestry and/or construction working apparatus according to claim 1, wherein
the garden, forestry and/or construction working apparatus is a saw, a pole-mounted power pruner, a brush cutter, hedge clippers, hedge cutters, a blower, a leaf blowing machine, branch shears, an angle grinder, a sweeper, a sweeper roller, a sweeping brush, a lawnmower, a scarifier, grass trimmers, a circular shear or an olive harvester.

10. The hand-guided garden, forestry and/or construction working apparatus according to claim 1, further comprising:
a control device, wherein the control device has the inactive state, the active state and the variable setting, and in the active state is designed to control the drive motor, and in the non-active state is designed not to control the drive motor.

11. A hand-guided garden, forestry and/or construction working apparatus, comprising:
an apparatus operator control element which is activatable by a user,
wherein the garden, forestry and/or construction working apparatus has an inactive state, an active state and a variable setting;
a drive motor, wherein the drive motor is configured to drive the garden, forestry and/or construction working apparatus; and
a motor operator control element which is activatable by a user,
wherein, in the inactive state, the garden, forestry and/or construction working apparatus is configured to be transferred into the active state triggered by activation of the apparatus operator control element,
wherein, in the active state, the garden, forestry and/or construction working apparatus is configured to change the variable setting and not to be transferred into the inactive state triggered by the activation of the apparatus operator control element,
wherein, in the active state, the garden, forestry and/or construction working apparatus is configured to operate the drive motor in accordance with activation of the motor operator control element, and, in the inactive state, is configured not to operate the drive motor irrespective of the activation of the motor operator control element, and
wherein the garden, forestry and/or construction working apparatus is configured not to operate the drive motor by the motor operator control element in the active state if the motor operator control element has been activated before the garden, forestry and/or construction working apparatus is transferred from the inactive state into the active state.

12. The hand-guided garden, forestry and/or construction working apparatus according to claim 11, further comprising:
an output device, wherein the output device is configured in the active state of the garden, forestry and/or construction working apparatus to output information about the active state, the setting, the activation of the motor operator control element before a transfer of the garden, forestry and/or construction working apparatus into the active state, and/or detection by way of the presence-detection element.

13. A method of operating a hand-guided garden, forestry and/or construction working apparatus having an inactive state, an active state and a variable setting, wherein the method comprises the steps of:
a) in the inactive state of the garden, forestry and/or construction working apparatus, transferring into the active state triggered by activation of an apparatus operator control element;
b) in the active state of the garden, forestry and/or construction working apparatus, changing the variable setting and not-transferring into the inactive state triggered by the activation of the apparatus operator control element;

c) in the active state of the garden, forestry and/or construction working apparatus, operating a drive motor in accordance with activation of a motor operator control element, and, in the inactive state, not operating the drive motor irrespective of the activation of the motor operator control element, and d) not changing the variable setting when the motor operator control element is activated, and changing the variable setting when the motor operator control element is not activated.

14. A method of operating a hand-guided garden, forestry and/or construction working apparatus having an inactive state, an active state and a variable setting, wherein the method comprises the steps of:

a) in the inactive state of the garden, forestry and/or construction working apparatus, transferring into the active state triggered by activation of an apparatus operator control element;

b) in the active state of the garden, forestry and/or construction working apparatus, changing the variable setting and not-transferring into the inactive state triggered by the activation of the apparatus operator control element;

c) in the active state of the garden, forestry and/or construction working apparatus, operating a drive motor in accordance with activation of a motor operator control element, and, in the inactive state, not operating the drive motor irrespective of the activation of the motor operator control element, and d) not operating the drive motor by the motor operating control element in the active state if the motor operator control element has been activated before the garden, forestry and/or construction working apparatus is transferred from the inactive state into the active state.

* * * * *